United States Patent [19]
Heil et al.

[11] Patent Number: 6,098,113
[45] Date of Patent: Aug. 1, 2000

[54] APPARATUS AND METHOD FOR ADDRESS TRANSLATION AND ALLOCATION FOR A PLURALITY OF INPUT/OUTPUT (I/O) BUSES TO A SYSTEM BUS

[75] Inventors: Thomas F. Heil, Easley; Edward A. McDonald, Lexington; James M. Ottinger, Columbia; Jeffrey A. Hawkey, Easley, all of S.C.

[73] Assignee: NCR Corporation, Dayton, Ohio

[21] Appl. No.: 08/417,701

[22] Filed: Apr. 6, 1995

Related U.S. Application Data

[63] Continuation of application No. 07/965,033, Oct. 22, 1992, abandoned, which is a continuation of application No. 07/761,081, Sep. 17, 1997, abandoned.

[51] Int. Cl.$^7$ .................................................. G06F 3/00
[52] U.S. Cl. .................................................. 710/1
[58] Field of Search .................... 395/822, 823, 395/824, 828, 829, 830, 847, 281, 284, 306, 308, 309, 310, 405, 412, 421.01, 421.1, 800; 710/1

[56] References Cited

U.S. PATENT DOCUMENTS

| | | | |
|---|---|---|---|
| 4,156,932 | 5/1979 | Robinson | 395/275 |
| 4,228,496 | 10/1980 | Katzman | 395/308 |
| 4,340,932 | 7/1982 | Baruva | 395/425 |
| 4,413,315 | 11/1983 | Kurakake | 395/400 |
| 4,437,157 | 3/1984 | Witawa et al. | 395/275 |
| 4,516,199 | 5/1985 | Frieder et al. | 395/840 |
| 4,695,948 | 9/1987 | Blevins et al. | 395/325 |
| 4,831,522 | 5/1989 | Henderson et al. | 395/402 |
| 4,851,990 | 7/1989 | Johnson et al. | 395/280 |
| 4,853,846 | 8/1989 | Johnson et al. | 395/325 |
| 4,870,704 | 9/1989 | Matelan et al. | 395/200 |
| 4,885,684 | 12/1989 | Austin et al. | 364/300 |
| 4,922,418 | 5/1990 | Dolecek | 395/800 |
| 4,935,894 | 6/1990 | Ternes et al. | 395/325 |
| 4,947,366 | 8/1990 | Johnson | 395/823 |
| 4,953,074 | 8/1990 | Kametani et al. | 364/132 |
| 4,969,108 | 11/1990 | Webb et al. | 364/513 |
| 4,989,261 | 1/1991 | Lee | 455/127 |
| 5,006,981 | 4/1991 | Beltz et al. | 395/325 |
| 5,117,350 | 5/1992 | Parrish et al. | 395/425 |
| 5,201,055 | 4/1993 | Izguerdo et al. | 395/800 |
| 5,241,631 | 8/1993 | Smith et al. | 395/306 |

OTHER PUBLICATIONS

Rosenberg, Jerry, Dictionary of Computers, Information Processing, and Telecommunications (2d ed. 1987) p. Webster's Ninth New Collegiate Dictionary (1990) pp 853,988.

*Primary Examiner*—Mark H. Rinehart
*Attorney, Agent, or Firm*—Jack R. Penrod

[57] ABSTRACT

Multiple subsystem I/O (Input/Output) buses are coupled to one or more system buses of a computer system by interface circuits which perform necessary decoding of memory space and I/O (Input/Output) space for allocation of portions of the memory space and the I/O (Input/Output) space to each I/O (Input/Output) bus. The interface circuits also translate fixed addresses within each I/O (Input/Output) bus to permit proper operation of the I/O (Input/Output) buses with the computer system. The interface circuits are programmed by the computer system to define the allocated memory spaces and I/O (Input/Output) spaces for the corresponding I/O (Input/Output) buses. Programming of the I/O (Input/Output) buses is performed at the time of system configuration by writing appropriate values into configuration registers incorporated into each of the interface circuits.

15 Claims, 8 Drawing Sheets

APPARATUS AND METHOD FOR ADDRESS TRANSLATION AND ALLOCATION FOR A PLURALITY OF INPUT/OUTPUT (I/O) BUSES TO A SYSTEM BUS

This is a continuation of application Ser. No. 07/965,033, filed Oct. 22, 1992 now abandoned. This is a continuation of application Ser. No. 07/761,081 filed on Sep. 17, 1991 now abandoned.

BACKGROUND OF THE INVENTION

The present invention relates generally to computer systems and, more particularly, to methods and apparatus for interfacing multiple I/O subsystem buses to a common computer system bus.

Computer systems have traditionally included a central processing unit or CPU, data storage devices including a main memory which is used by the CPU for performance of its operations and a system bus which interconnects the CPU to the main memory and any other data storage devices. In addition, I/O devices are connected to the system via the bus. The bus thus serves as a communications link among the various devices making up a system by carrying clock and other command signals and data signals among the devices.

To improve the operation of computer systems for performing more and more instructions in less and less time, computer systems have evolved to systems which include multiple computers and/or multiple system buses. While substantial improvements have been made, operation of these computer systems is still limited by the system bus or buses which ultimately are overcome by the massive amounts of data and control information which must be passed between units coupled to the bus.

To expand the capacity of the system bus or buses, subsystem I/O buses have been added to computer systems. A subsystem I/O bus is typically coupled to the system bus or buses to connect additional devices or agents to the computer system such that these additional resources can be used by the computer system and thereby expand the processing capabilities of the system. The addition of a subsystem I/O bus is advantageous since it presents only one load for the system bus or buses yet provides system access to a number of agents. If the agents are directly coupled to the computer system, they load the bus with a load per device, such as eight or sixteen bus loads, as opposed to the single bus load presented by the subsystem I/O bus.

It is desirable to further expand the capacity of a computer system by the addition of multiple subsystem I/O buses each of which presents only one system bus load but expands the resources available by a number substantially greater than one. Unfortunately, available subsystem buses include hardware which is not compatible in terms of memory space and input/output (I/O) space allocation within a computer system which includes more than one or multiple subsystem I/O buses. Further, known subsystem I/O buses include hardware which fixes certain addresses associated with the subsystem buses.

Accordingly there is a need for methods and apparatus for interfacing multiple subsystem I/O buses to the system bus or buses of a computer system.

SUMMARY OF THE INVENTION

This need is met by the methods and apparatus of the present invention wherein multiple subsystem I/O buses are coupled to one or more system buses of a computer system by interface circuits which perform necessary decoding of memory space and I/O space for allocation of portions of the memory space and the I/O space to each I/O bus. In addition, the interface circuits translate fixed addresses within each I/O bus to permit proper operation of the I/O buses with the computer system. Preferably, the interface circuits can be programmed by the computer system to define the allocated memory spaces and I/O spaces for the corresponding I/O buses. Programming of the I/O buses can be performed at the time of system configuration by writing appropriate values into register means which are incorporated into each of the interface circuits.

In accordance with one aspect of the present invention, apparatus for interfacing multiple I/O buses to a system bus of a processing system having at least one processor coupled to the system bus comprises address allocation means for identifying memory addresses and I/O addresses which are allocated to each of the multiple I/O buses. Address converter means are also provided for translating addresses generated by the processor into common fixed addresses associated with each of the multiple I/O buses.

Preferably, the address allocation means and the address converter means are programmable by the processor at the time the processing system is configured. In the illustrated embodiment, the programmable address allocation means comprises multiple register means, one register means being associated with each of the multiple I/O buses for receiving data from the processor to identify allocated ranges of memory addresses and ranges of I/O addresses for the multiple I/O buses.

Each of the multiple register means may comprise a top-of-memory/bottom-of-memory (TOM/BOM) register for receiving data identifying the range of memory addresses for a corresponding I/O bus, and a top-of-I/O/bottom-of-I/O (TIO/BIO) register for receiving data identifying the range of I/O addresses for a corresponding I/O bus. The multiple register means may further comprise a ROM expansion register for receiving data identifying expansion ROM slices for a corresponding I/O bus and an 8M–16M local bits register for receiving data identifying which 1M slice in the 8M–16M range is allocated for a corresponding I/O bus.

Preferably, the programmable address converter means comprises multiple translation registers means, one register means being associated with each of the multiple I/O buses for receiving data from the processor to identify base values used to translate addresses used to access the common fixed addresses associated with each of the multiple I/O buses. Each of the translation register means comprises a dedicated translation register for receiving data identifying a base offset value for common fixed addresses associated with each of the multiple I/O buses.

In accordance with another aspect of the present invention, a method for interfacing multiple I/O buses to a system bus of a processing system having at least one processor coupled to the system bus comprises the steps of: partitioning memory addresses and I/O addresses to allocate the addresses among the multiple I/O buses; and, specifying base offset values for common fixed addresses associated with each of the multiple I/O buses. The method may further comprise the steps of: transferring allocated addresses to the multiple I/O buses during system configuration; and, transferring base offset values to the multiple I/O buses during system configuration. Preferably, the method further comprises the step of enabling memory and I/O operations for a given I/O bus in response to addresses allocated thereto and further comprises the step of stripping out the base offset values from addresses to the common fixed addresses associated with each of the multiple I/O buses such that agents on each of the I/O buses are not required to be adapted for the existence of more than the I/O bus to which it is coupled.

It is an object of the present invention to provide improved methods and apparatus for coupling multiple subsystem I/O buses to one or more system buses of a computer system; to provide improved methods and apparatus for coupling multiple subsystem I/O buses to one or more system buses of a computer system by interface circuits which perform necessary decoding of memory space and I/O space for allocation of portions of the memory space and the I/O space to each I/O bus; and, to provide improved methods and apparatus for coupling multiple subsystem I/O buses to one or more system buses of a computer system wherein fixed addresses within each I/O bus are translated to permit proper operation of the I/O buses with the computer system.

Other objects and advantages of the invention will be apparent from the following description, the accompanying drawings and the appended claims.

DETAILED DESCRIPTION OF THE INVENTION

Figure 1A:
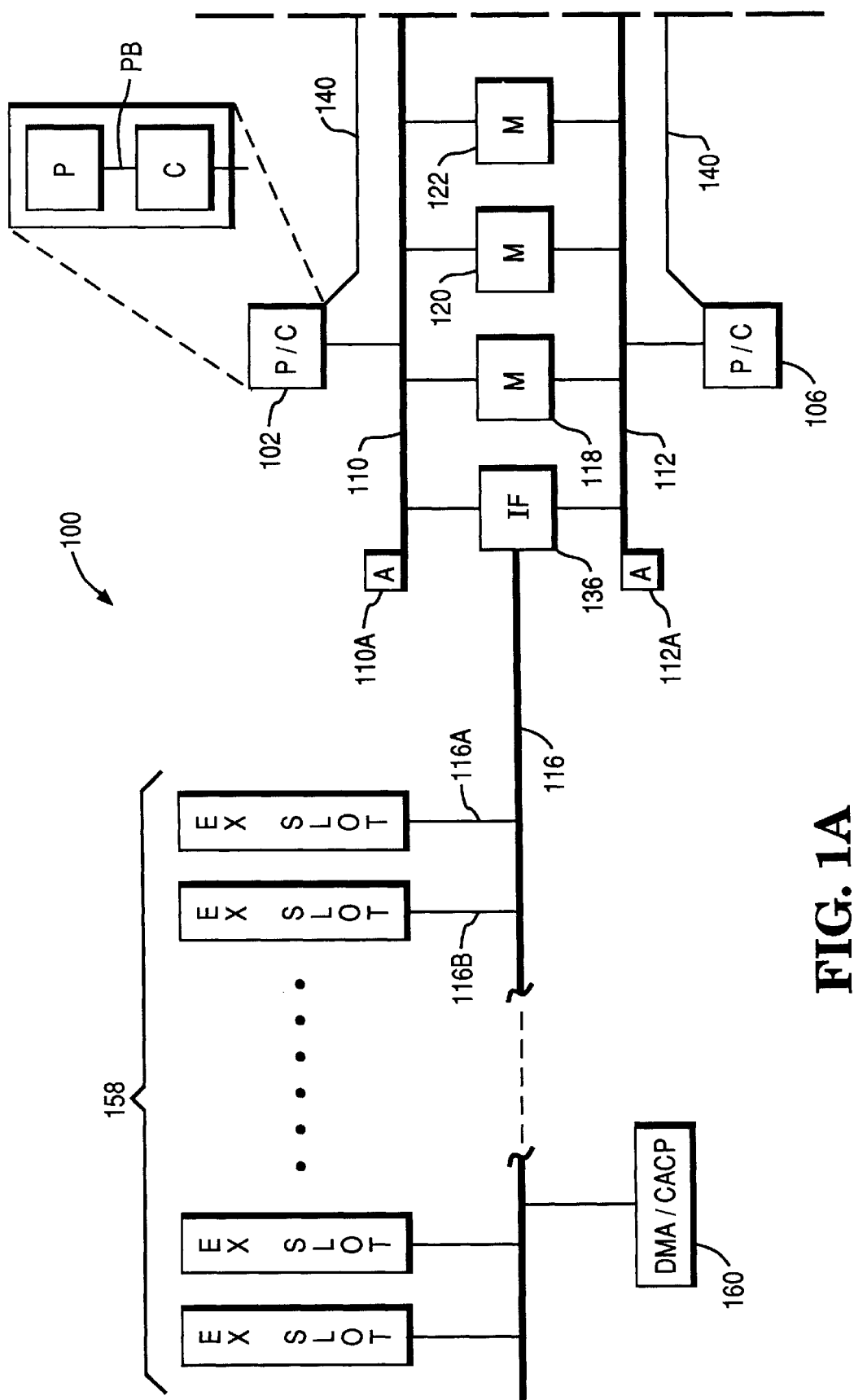
FIGS. 1A and 1B when joined together form a block diagram of a multiple processor system including four processors, two system buses and two subsystem I/O buses interfaced to the system buses in accordance with the present invention.

Reference will now be made to the drawing figures wherein FIGS. 1A and 1B together form a block diagram of a multiple processor system 100 including four processors 102, 104, 106, 108, two system buses 110, 112 and two subsystem I/O buses 114, 116 interfaced to the system buses 110, 112 in accordance with the present invention. The processors 102 and 104 are coupled to the system bus 110 and the processors 106 and 108 are coupled to the system bus 112. In the preferred embodiment, the system buses 110, 112 are non-multiplexed, tenured, burst buses. Tenured implies a master owns the bus for the duration of a data transfer and non-multiplexed implies separate physical address and data paths. Burst implies one address is put on a system bus and then groups of data bits, for example either 32 or 64 bits of data in the preferred embodiment, are transferred on each system bus clock until an entire memory data line is transferred.

The processors 102–108 are coupled to four independent, dual ported memory interleaves 118, 120, 122 and 124 via the system buses 110, 112 which may also be denominated memory buses. Interleaving is a memory partitioning scheme which interleaves linearly addressed memory lines across multiple memory banks. For example, in the four-way interleave shown in FIGS. 1A and 1B, line address 0 is mapped to bank 0, memory interleave 118; line address 1 is mapped to bank 0, memory interleave 120; line address 2 is mapped to bank 0, memory interleave 122; line address 3 is mapped to bank 0, memory interleave 124; line address 4 is mapped to bank 0, memory interleave 118; and so forth until bank 0 of memory interleaves 118–124 is filled, then the next line address is mapped to the banks 1 of the memory interleaves 118–124. While four memory interleaves are shown in the multiple processor system 100 of FIGS. 1A and 1B, any reasonable number of interleaves may be used in the disclosed architectures with from one to four being typical.

Also coupled to the system buses 110, 112 are a dual ported interrupt controller 126 and I/O bus interface means comprising dual ported I/O bus interface circuits 134 and 136 with the I/O bus interface circuit 134 interfacing the I/O bus 114 to the system buses 110, 112 and the I/O bus interface circuit 136 interfacing the I/O bus 116 to the system buses 110, 112. Operation of the interrupt controller 126 and the I/O bus interface circuits 134, 136 will be described hereinafter.

The I/O bus 114 is designated as the primary I/O bus and couples a video subsystem 138 to the multiple processor system 100. The video subsystem 138 is also directly coupled to the processors 102–108 via a video bus 140. A peripheral bus 142 is coupled to the I/O bus 114 and connects the multiple processor system 100 to standard peripheral devices 144, ROM/RAM 146, a diagnostic processor 148 and a configuration and test (CAT) controller 150 which also interfaces to the multiple processor system 100 via a CAT bus 152. A direct memory access (DMA) controller 154 which houses a central arbitration control point (CACP) for the I/O bus 114 is also coupled to the I/O bus 114 for direct memory access operations.

A number of expansion slots 156 are provided on the I/O bus 114 for interfacing a corresponding number of agents to the multiple processor system 100. For example, a preferred I/O bus for the multiple processor system 100 is commercially available from the IBM corporation under the name Micro Channel, which provides 8 expansion slots. Thus, by utilizing the architecture disclosed in the present application, a number of expansion slots corresponding to the I/O bus used in the multiple processor system 100 can be provided for a single load on the system bus, i.e. the system buses 110, 112. If the noted IBM I/O bus is used, 8 expansion slots are provided while other I/O buses will provide alternate numbers of expansion slots depending upon the selected I/O bus. The I/O bus 116 in the illustrated multiple processor system 100 provides an additional number of expansion slots 158 and also includes a DMA controller 160 with a CACP coupled to the I/O bus 116.

While four processors 102–108 are shown in the illustrative embodiment, it is apparent that any reasonable number of processors can be used in the disclosed system architectures dependent upon a given application and the required processing power. In addition, dual processors can be provided in the place of the single processors 102–108. The processors 102–108 preferably are 80486 processors which are commercially available from the Intel Corporation. In any event, the processors 102–108 comprise a processing unit P and a copy-back cache memory C which are interconnected by a processor bus PB as shown by the expansion of the processor 102 in FIG. 1A.

A copy-back cache keeps both read hits and write hits off the system bus or memory bus, i.e. the system buses 110, 112. A write hit modifies its internal cache entry and marks the line as modified in the cache memory. A global cache consistency protocol ensures that only one copy-back cache memory is allowed to own and freely modify a line without informing the system. Since the owner cache may have the only valid copy of a line of data, that cache must update the system memory when it replaces a modified line of data. The owner cache is also responsible for supplying the line contents in response to a request for the line from any other system device.

Figure 1B:
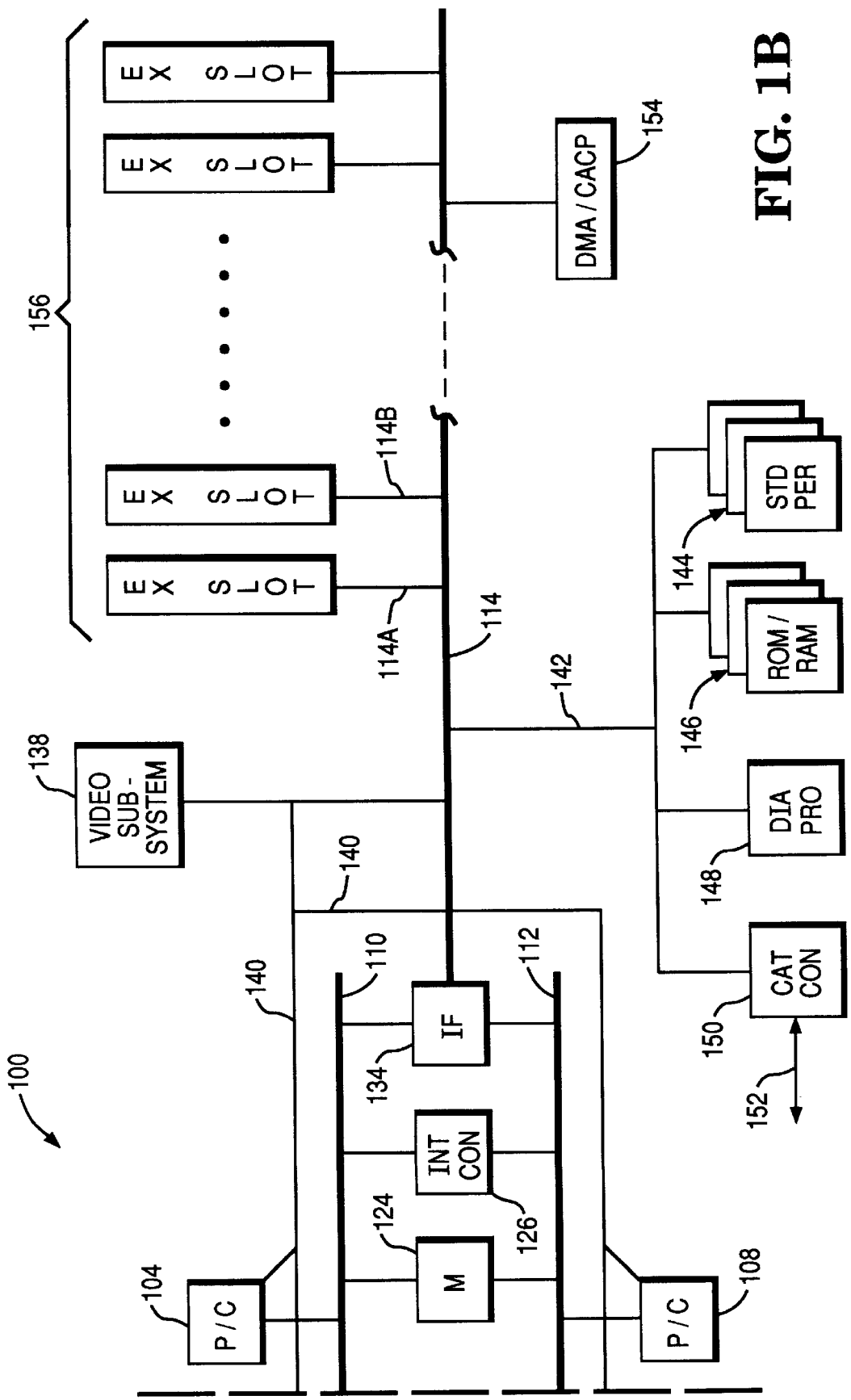
Figure 2:
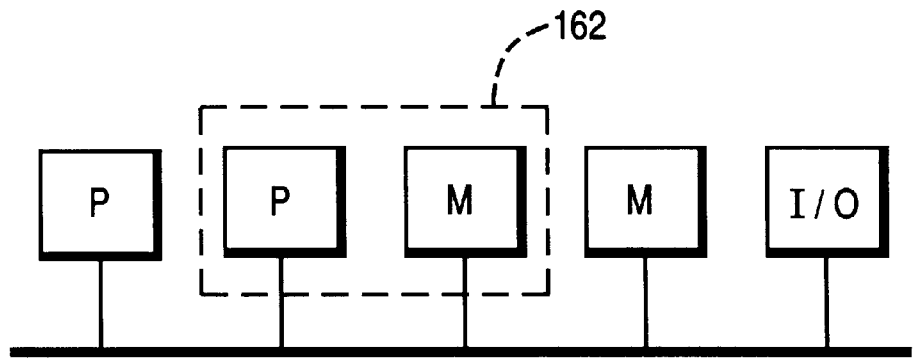
FIGS. 2 and 3 are block diagrams of down-scaled configurations of the multiple processor system of FIGS. 1A and 1B.
Figure 3:
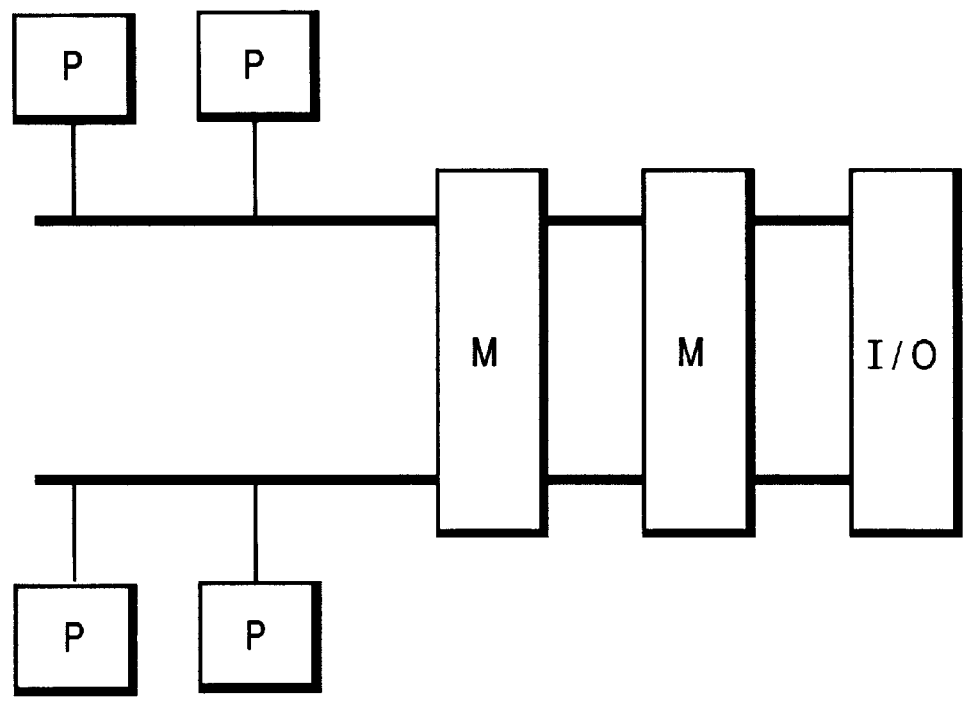
Figure 4:
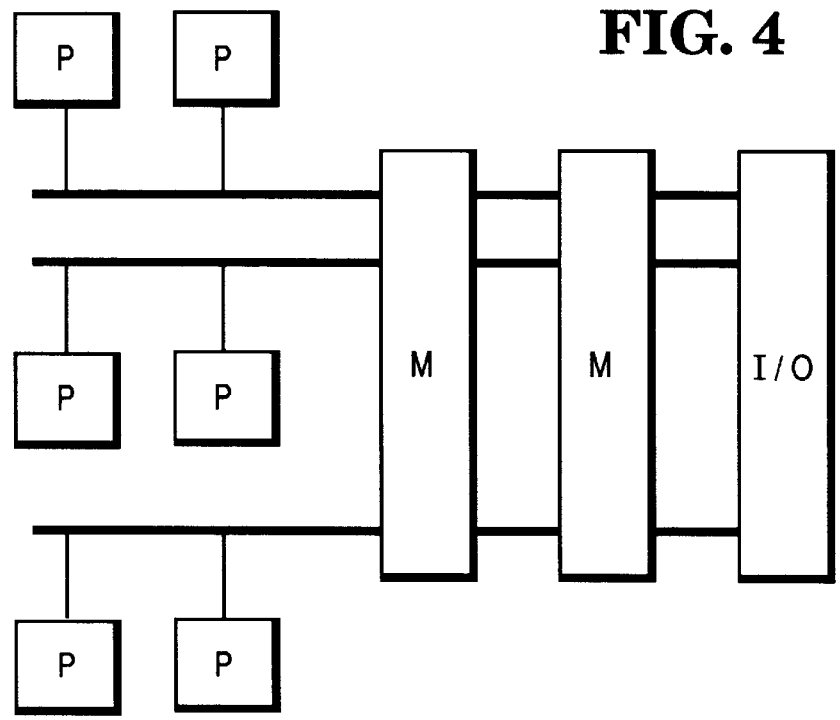
FIGS. 4 and 5 are block diagrams of up-scaled configurations of the multiple processor system of FIGS. 1A and 1B.
Figure 5:
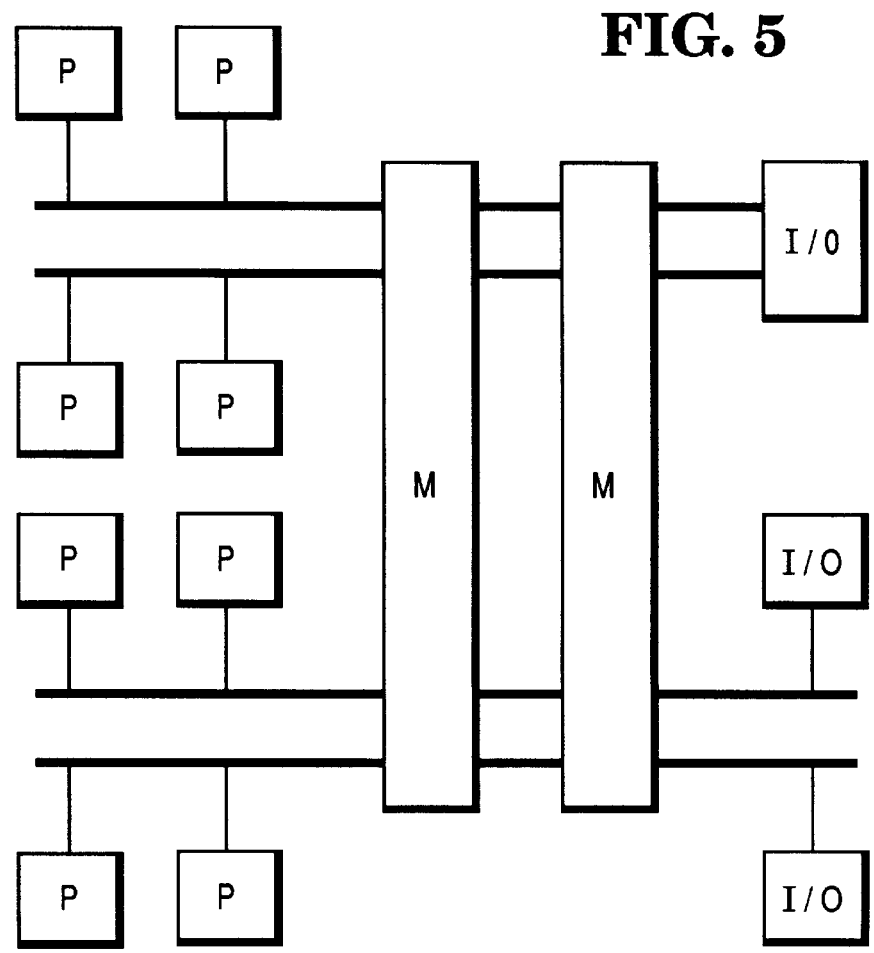

The configuration of FIGS. 1A and 1B can be up-scaled, for example to the configurations of FIGS. 4 and 5 or down-scaled, for example to the configurations of FIGS. 2 and 3, with the ultimate down-scaling being to a system 162 having one bus with one processor and one ported memory as shown in the dotted line box of FIG. 2. Configurations range from this simplest case of one bus and one ported memory with one or more processors to N buses with N ported memories with one or more processors connected to each of the N buses. In particular, FIGS. 2–5 show a unibus system, a dual bus system, a tribus system and a quadbus system, respectively. Note that in general the I/O buses can either be ported across all N system buses or else ported across some number of the system buses less than N. In the latter case, the N ported memory would implement intelligent decoder and bus-to-bus bridge services in hardware to ensure all processors have an identical view of I/O resources.

An important feature of the multiple processor computer system architectures of the present application is that the system buses 110, 112 and the I/O buses 114, 116 are independently arbitrated system resources, i.e. the multiple processor system 100 includes a decoupled bus structure. Independent arbitration is performed for all system and I/O buses for all system configurations. For example, in the illustrated embodiment of FIGS. 1A and 1B, the system buses 110, 112 each include their own arbitration circuitry 110A, 112A as a part of the bus system, with arbitration being performed in accordance with well known arbitration strategies based, for example, on assigned priority levels. Similarly, arbitration of the I/O buses 114, 116 is independently performed in accordance with well known arbitration strategies.

Thus, when an agent arbitrates to become owner of the I/O bus to which it is connected, the agent wins ownership only of that I/O bus. Only when an I/O bus interface circuit decodes that an agent wants to access the main memory does it arbitrate for a system bus and run a memory cycle. An agent can therefore communicate with other agents on its I/O bus while the processors of a multiple processor system still have complete access to the memory interleaves over the system bus, i.e. the system buses 110, 112 in the multiple processor system 100 of FIGS. 1A and 1B.

Figure 6:
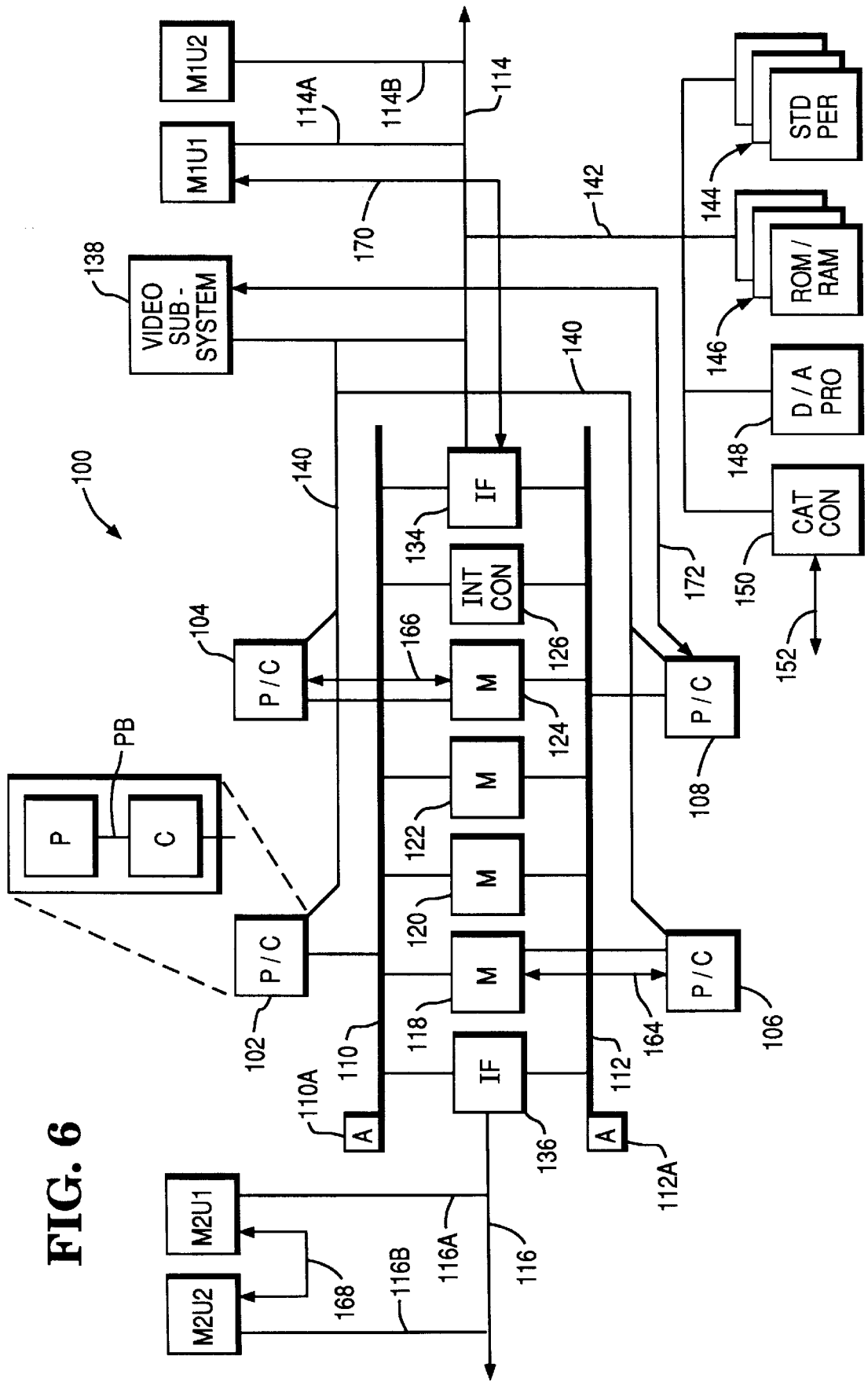
FIG. 6 is a block diagram of the multiple processor system of FIGS. 1A and 1B illustrating operations which can be performed simultaneously on that system.

The block diagram of FIG. 6 illustrates how the decoupled bus structure of the disclosed architectures facilitates operations within the multiple processor system 100 by means of the many possible concurrent operations which can be performed. For example, as shown in FIG. 6, the processor 106 is coupled to the memory interleave 118 via the system bus 112 through a path 164 while the processor 104 is coupled to the memory interleave 124 via the system bus 110 through a path 166.

In addition, the following system operations are also taking place concurrently with the operations of the processors 106, 104: two I/O bus agents M2U1 and M2U2 are coupled to one another via the I/O bus 116 through a path 168; a bus agent M1U1 is coupled to the I/O bus interface circuit 134 via the I/O bus 114 through a path 170, perhaps awaiting availability of one of the system buses 110, 112 for a memory operation; and, the processor 108 is coupled to the video subsystem 138 via the video bus 140 through a path 172. Of course, the paths 164–172 are merely representative of the numerous concurrent paths through the multiple processor system 100 illustrative of the architectures disclosed in the present application. It is apparent that the decoupled bus structure together with the use of memory interleaves and cache memories minimizes use of the system bus and memory of systems configured in accordance with the disclosed architectures in addition to enabling concurrent operation of the system processors and agents resident on the I/O buses.

An additional feature of the disclosed multiple processor systems is that they enable agents on the I/O buses to run at substantially full speed when moving data to or from the main memory, i.e. the memory interleaves 118–124 of FIGS. 1A and 1B. To that end, the I/O bus interface circuits 134, 136 are arranged to supply data read from main memory as fast as an agent can receive it, and to receive data written to the main memory as fast as an agent can supply it. This not only improves each agent's performance, but also lowers each agent's utilization of I/O bus bandwidth. Lower utilization of I/O bus bandwidth allows more agents to be serviced by an I/O bus and reduces processor latency when accessing I/O bus resources, i.e. agents on the I/O buses.

Data exchanges between agents on an I/O bus and the main memory or memory interleaves of multiple processor systems of the present application will now be described with reference to FIG. 7 which is a schematic block diagram of the I/O bus interface circuit 134 of FIG. 1B. Since the I/O bus interface circuits 134, 136 are very similar to one another and can be substantially identical, only the I/O bus interface circuit 134 will be described herein. Maximum efficiency is achieved when the I/O bus interface circuits 134, 136 use the system bus's full line (16 or 32 byte) burst read and write cycles. These cycles optimally exploit the interleaved memory architecture, which in turn is optimized for transactions between the memory interleaves and processor copy-back caches.

For the I/O bus interface circuits 134, 136 to accommodate the system bus's full line burst read and write cycles, data is buffered in the I/O bus interface circuits 134, 136. For writes, a number of writes by an I/O bus agent are accumulated in buffering means comprising at least one buffer register, and for reads, at least one line of data from the system memory is read into the same buffering means. The read and write buffering operations exploit the fact that most I/O bus agents or masters are "block oriented", i.e. data moves are typically large, relatively well organized and progress in linearly ascending address order. This is particularly useful for the I/O bus's streaming mode protocols, which are by definition homogeneous, i.e. a single data stream is either all reads or all writes, and constrained to linearly ascending address order.

Figure 7:
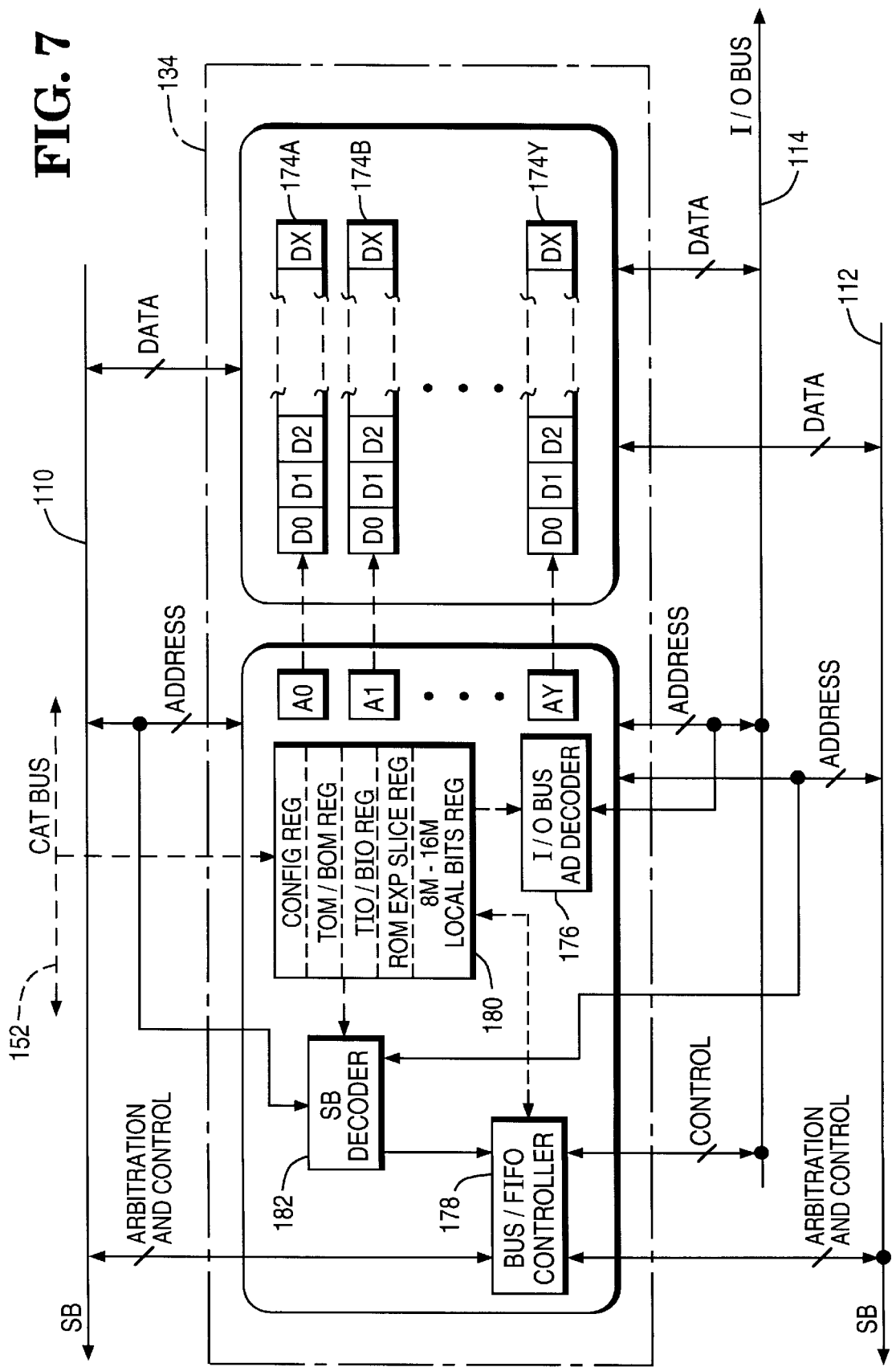
FIG. 7 is a schematic block diagram of an I/O bus interface circuit of the multiple processor system of FIGS. 1A and 1B.
Figure 8:
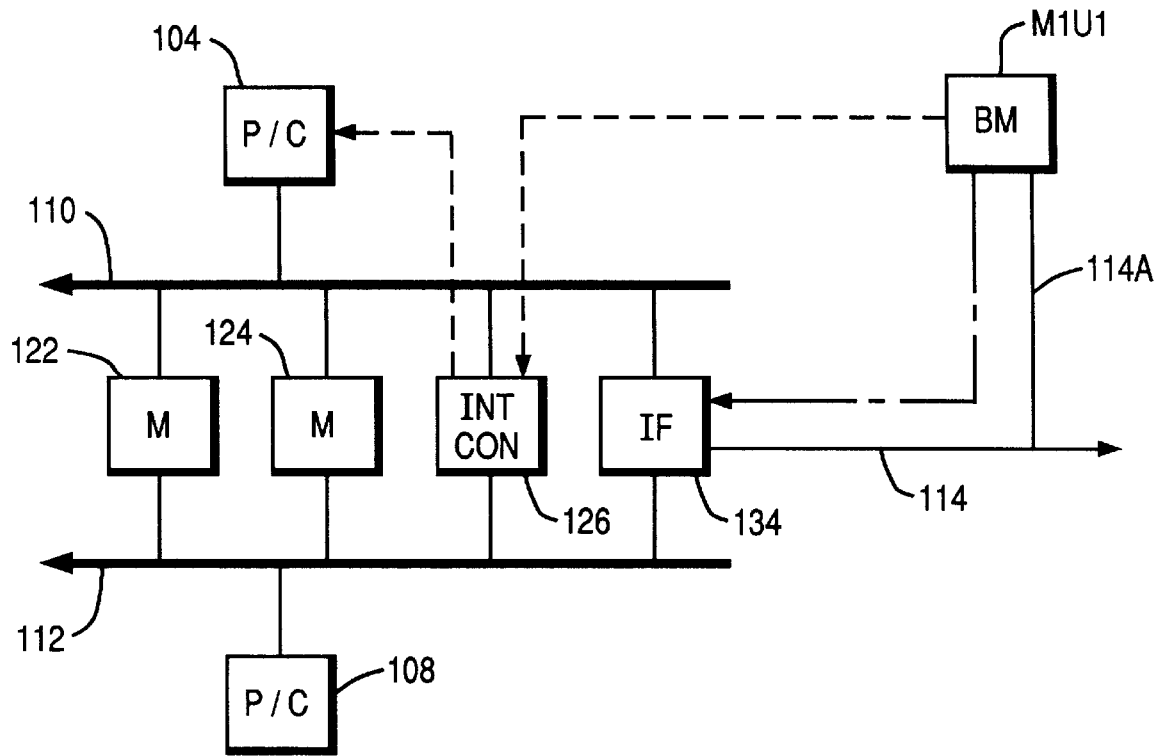
FIGS. 8–11 which show a portion of the multiple processor system of FIGS. 1A and 1B to illustrate operation of the multiple processor system in a manner to ensure that only up-to-date data is used.
Figure 9:
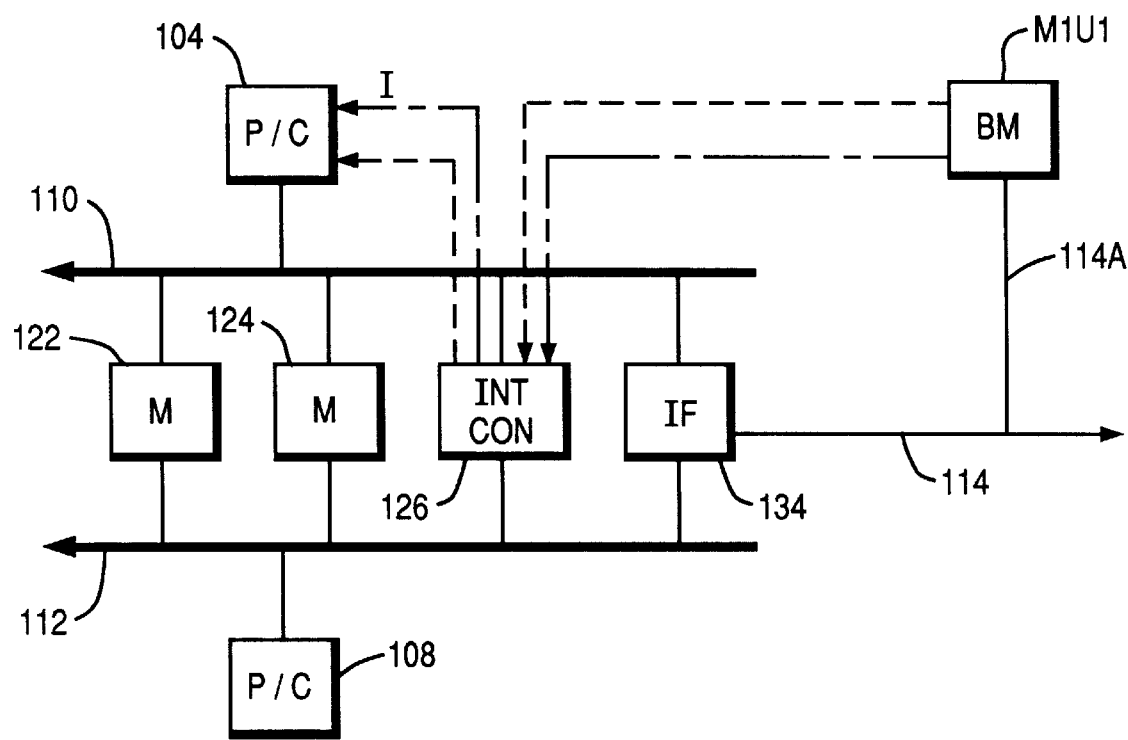
Figure 10:
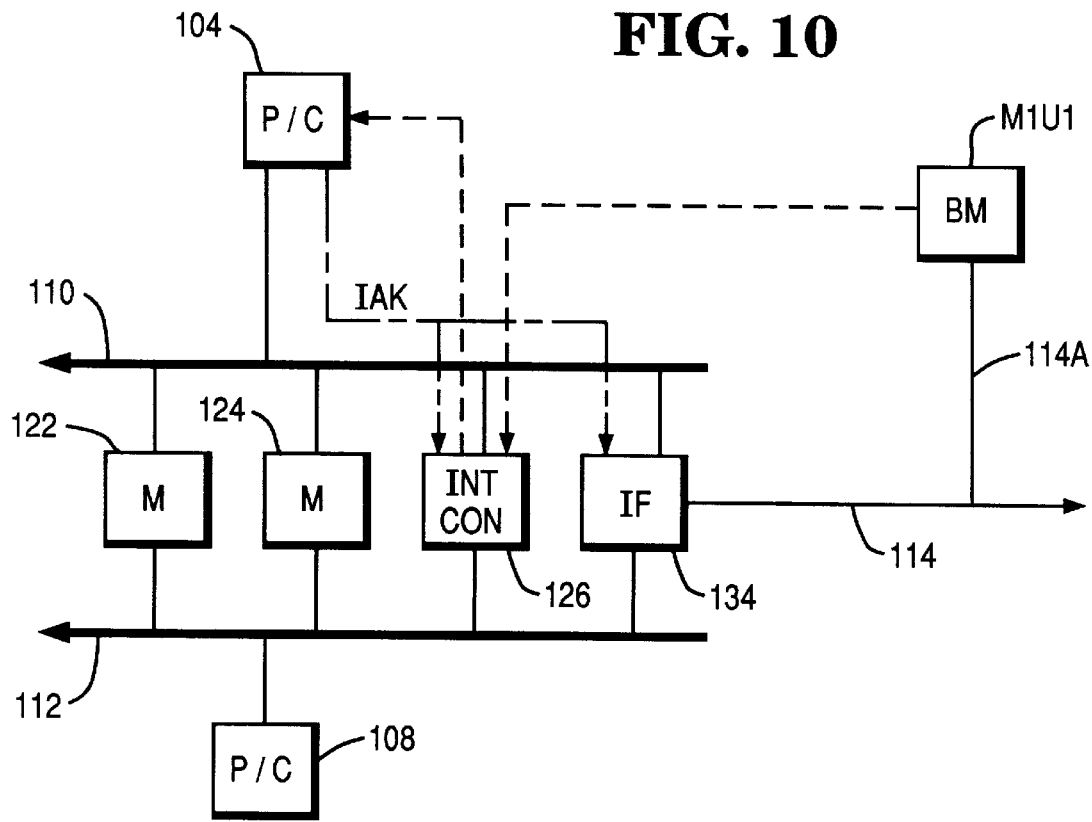

In the embodiment of the I/O bus interface circuit 134 shown in FIG. 7, the buffer registers comprise first-in-first-out (FIFO) registers 174A–174Y. Each of the FIFO registers 174A–174Y comprises X+1 data words, D0–DX, and stores an entire memory line of data, either 128 or 256 bits. For example, X can be equal to 7 such that 8 data words of 16 bits or 32 bits each are stored in each FIFO register 174A–174Y for a 128 or 256 bit line of data, respectively.

When an I/O bus address decoder 176 of the I/O bus interface circuit 134 decodes a bus master write to main memory, the write is not immediately propagated to the system bus, i.e. one of the system buses 110, 112. Rather the data is latched in the I/O bus interface circuit 134, more particularly into the FIFO registers 174A–174Y and the bus master cycle terminated immediately. Thus, the I/O bus interface circuit 134 accepts the data as fast as the agent which is the current bus master supplies it. Now assume the master continues running writes in linear address order, or else initiates a stream. The I/O bus interface circuit 134 continues to latch data without delay until an entire line, 16 or 32 bytes depending on the system configuration, is captured or "packed" in one of the FIFO registers 174A–174Y or "line buffers".

Only then does a bus/FIFO controller 178 of the I/O bus interface circuit 134 arbitrate for the system bus, i.e. one of the system buses 110, 112 and propagate the data to the main memory or memory interleaves 118–124 as a single write line burst. Meanwhile, another FIFO register or line buffer in the I/O interface circuit 134 continues to accept and pack data from the master without interruption.

In a preferred embodiment of the multiple processor system 100 of FIGS. 1a and 1B, the I/O bus interface circuits 134, 136 have either 4 or 8 FIFO registers or line buffers, depending on the system configuration, such that Y would be equal to 3 or 7, of course any reasonable number of FIFO registers can be used as required for a given application. In this way, the FIFO registers 174A–174Y are continuously filled by the master, emptied to the main memory via the system bus, and then made available again for new data. The line buffers or FIFO registers 174A–174Y continue to roll over indefinitely causing no delays to the master, unless the system bus falls sufficiently behind so that all the buffers fill before one can be emptied. In this case the master is stalled until a register or line buffer becomes available.

The term "packing" implies that multiple bus master cycles are assembled into a single system bus burst write. For example, 8 cycles of a 32-bit master will be packed into a single system bus write for a line size of 32 bytes. Preferably, the line size matches that of the system cache memories such that there will be at most one cache coherency operation associated with the 8 bus master cycles. In the case of a 16-bit master, 16 of its cycles will be packed into a single system bus write.

When the I/O bus address decoder 176 of the I/O bus interface circuit 134 decodes a bus master read from main memory, it stalls the master and immediately arbitrates for the system bus. Once one of the system buses 110, 112 is won, the I/O bus interface circuit 134 fetches an entire data line from main memory in a single burst read and stores it locally in a line buffer or one of the FIFO registers 174A–174Y. The data requested by the master is driven onto the I/O bus 114 and the master is released. If the master continues reading in linear address order, or else initiates a stream, the I/O bus interface circuit 134 then supplies data out of its line buffer with no delays.

Anticipating that the master will continue to request data in linearly ascending order, the I/O bus interface circuit 134 may initiate additional system bus burst reads, i.e. read-aheads or prefetches, that fill additional line buffers or ones of the FIFO registers 174A–174Y. Thus, the I/O bus interface circuit 134 attempts to anticipate the master and have the desired data ready and waiting locally when the master requests it. The I/O bus interface circuit 134 can be selectively configured to prefetch 1 line of data or up to the number of lines of data corresponding to the number of line buffers or FIFO registers 174A–174Y from the main memory, for example, 1, 2, 4 or 8 lines of data may be prefetched based on the arbitration level of the bus agent or master performing the memory read. The number of lines which are prefetched are correlated to the bus agents such that the number of lines prefetched corresponds to the number of lines which are typically read by the agent.

Unlike the write operation of the I/O bus interface circuit 134, the first bus master read is stalled while the I/O bus interface circuit 134 fetches the first line of data from main memory. However, in the case of a 32-bit master and a 32 byte line size, the next 7 cycles are serviced from line buffer or one of the FIFO registers 174A–174Y without delay. Accordingly, the time losses associated with stalled reads are efficiently amortized over a much larger number of non-delayed reads such that average read latency is low.

A method and apparatus for operating the disclosed multiple processor architectures in a manner to ensure that only up-to-date data is used will now be described. The high performance multiple processor architectures of the present application include storage of data to be written to the main memory in the I/O bus interface circuits 134, 136 as described. This storage of write data in the I/O bus interface circuits 134, 136 ensures that data is accepted as fast as the agent which is the current bus master can supply it; however, until it is written to main memory, the data contained in the main memory is not up-to-date. Copy-back cache memories also may contain the only accurate copies of data rather than the main memory. In addition, the interrupt controller 126 of the disclosed multiple processor systems is tightly coupled, i.e. the interrupt controller 126 can be quickly accessed by agents resident on the I/O buses 114, 116 and the processors 102–108 resident on the system buses 110, 112 without having to gain access to or own an I/O bus or a system bus.

Accordingly, in the high performance architectures of the present application, one must ensure that data written by a bus agent to main memory has reached main memory and is not still propagating through the FIFO registers 174A–174Y of the I/O bus interface circuits 134, 136 before an interrupt is processed. Further, one must ensure that any cached copies of target memory locations are either invalidated or updated before an interrupt is serviced. Otherwise, an interrupt service routine (ISR) may be invoked in response to an interrupt acknowledge cycle and process data from the main memory which is not up-to-date.

Reference will now be made to FIGS. 8–11 which each show a portion of the multiple processor system 100 of FIGS. 1A and 1B to illustrate operation of the multiple processor system 100 in a manner to ensure that only up-to-date data is used. When an I/O bus master M1U1 writes to main memory, the FIFO registers 174A–174Y of the I/O bus interface circuit 134 latch the address/data and immediately release the master M1U1, i.e. the master M1U1 does not have to wait for the data to reach main memory before its cycle is terminated, see FIG. 8.

As soon as the write cycle of the bus master M1U1 is terminated, from the perspective of the master M1U1 the write is complete and it generates an interrupt signal indicating completion of the write cycle to an associated processor shown in FIGS. 8–11 to be the processor 104. Since the interrupt controller 126 resides on the system bus and can be accessed concurrently with I/O bus master activity, the interrupt I is passed to the processor 104, see FIG. 9, which generates an interrupt acknowledge (IAK) cycle on the system bus 110 to fetch an interrupt vector from the interrupt controller 126 such that the processor 104 can perform a corresponding interrupt service routine (ISR), see FIG. 10. In accordance with this aspect of the operation of the disclosed multiple processor systems, servicing of the IAK cycle is deferred to ensure that only up-to-date data is used by the systems.

Figure 11:
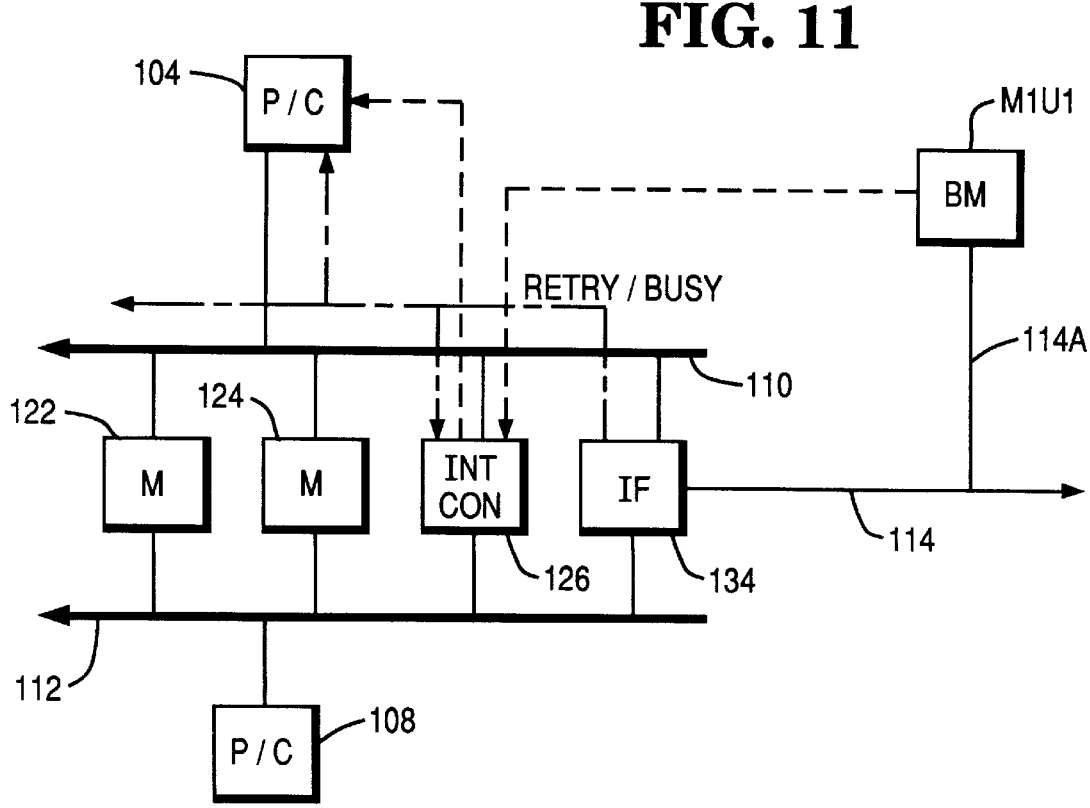

When a processor, such as the processor 104, issues an IAK cycle on the system bus, such as the system bus 110, in response to an interrupt request from a bus master, such as the bus master M1U1, if the system bus is not the current owner of the I/O bus, such as the I/O bus 114, i.e. the I/O bus is owned by some other bus master and thus data may reside in the FIFO, the appropriate I/O bus interface circuit, here the I/O bus interface circuit 134, issues a retry signal to the processor for the IAK cycle as if the I/O bus interface circuit was the selected slave rather than the interrupt controller 126 and the I/O bus interface circuit raises a busy signal, see FIG. 11. The interrupt controller 126 monitors the system bus to detect the retry signal issued by the I/O bus interface circuit, and waits a period of time corresponding to a predetermined number of clock cycles before responding as slave to the IAK cycle and returning an appropriate interrupt vector. If the interrupt controller 126 does not see a retry signal during the wait time period, the I/O bus interface circuit 134 is not going to issue a retry signal and accordingly, the interrupt controller 126 supplies the appropriate interrupt vector and terminates the IAK cycle normally.

The retry signal causes the processor 104 to get off the system bus, its IAK cycle still pending. The system bus arbitration circuitry 110A, 112A will not allow the processor onto the system bus again until the I/O bus interface circuit removes its busy signal. Eventually the system bus acquires ownership of the I/O bus; however, the I/O bus interface circuit will not remove its busy signal until all bus master to main memory writes still pending in its FIFO registers 174A–174Y from the previous owner are completed and all associated coherency operations are complete. The I/O bus interface circuit 134 monitors the system bus to determine when coherency operations are complete. Until the I/O bus interface circuit 134 removes its busy signal, it will continue to issue retry signals in response to any attempt by any other processor to access the I/O bus or to do an IAK cycle.

When the I/O bus interface circuit 134 finally removes its busy signal, the arbitration circuitry 110A, 112A enables the processor 104 that originally attempted the IAK cycle to reissue the cycle. This time, since the I/O bus interface circuit 134 is not busy it does not issue a retry signal, and the interrupt controller 126 supplies an interrupt vector and terminates the cycle. Although in this case the I/O bus interface circuit does not issue a retry signal, it does "lock" I/O bus ownership and will not surrender it to another master until the I/O bus interface circuit 134 detects that the interrupt controller 126 has successfully supplied an interrupt vector to the processor 104 and terminated the IAK cycle. This procedure protects against the possibility of another I/O bus agent gaining ownership of the I/O bus as master, issuing a memory write to the I/O bus interface circuit 134, and then issuing a higher priority interrupt before the pending IAK completes. If bus ownership by another master was allowed to occur, there is a possibility that the interrupt controller 126 would supply an interrupt vector for the higher priority interrupt, even though its associated data is still in the FIFO registers 174a–174Y of the I/O bus interface circuit 134. System performance can be enhanced and deadlocks can be avoided by handling non-IAK cycles to a busy I/O bus in a manner similar to the handling of IAK cycles as just described.

While all I/O bus interface circuits of a system, such as the I/O bus interface circuits 134, 136 of the multiple processor system 100, can be configured to retry processors issuing interrupt acknowledge (IAK) cycles when buffered data is resident in the interface circuits, such operation can only delay performance of the system. System delay results if all buffered data has been flushed to main memory before an IAK cycle was completed. Accordingly, it is preferred to provide the described IAK retry operation only for the I/O interface bus 134 for the primary I/O bus 114. Flushing of data from any additional I/O buses, such as the I/O bus 116, is ensured by having the processor or processors of a system perform an I/O access to any additional I/O buses which, though slower than the IAK retry operation of the I/O bus interface 134, ensures any resident data is flushed to main memory.

Methods and apparatus for interfacing multiple decoupled I/O buses to a common system bus in accordance with the present invention will now be described with reference to the preferred I/O bus, IBM's Micro Channel; however, it should be understood that the present invention is generally applicable to whatever I/O bus may be selected for use in a given multiple processor system. The benefits of using multiple decoupled I/O buses, among others, include greater configurability for a multiple processor system since each added I/O bus will support a corresponding number of expansion slots, for example 8 in the case of the preferred I/O buses. Since the I/O buses are independent and buffer read/write main memory data, the achievable I/O data rate grows linearly with the addition of each I/O bus. Additional I/O buses can be added as I/O bandwidth and capacity requirements grow. Also, since each additional I/O bus is independently buffered, there are no inherent electrical loading issues associated with adding I/O buses apart from 1 extra load on the system bus. For example, with the use of a Micro Channel I/O bus, 1 extra system bus load provides capacity for 8 additional I/O agents. In the multiple processor systems disclosed in the present application, it is noted that each I/O bus has it's own I/O bus interface circuit and DMA with included CACP.

Two decoding arrangements in accordance with the present invention are utilized to interface multiple I/O buses to a computer system bus, used herein to accommodate multiple I/O buses in multiple processor systems: a programmable decoder that partitions available memory and I/O space among I/O buses; and, an address translator that keeps hardware, such as off-the-shelf third party agents as well as the DMA/CACP, on each I/O bus from having to comprehend the existence of more than one I/O bus.

Each I/O bus interface circuit for the I/O buses, such as the I/O bus interface circuit 134 illustrated in FIG. 7, includes a set of I/O bus configuration registers 180. Some of the I/O bus configuration registers 180 define the memory and I/O addresses to which the I/O bus will respond. During system configuration, the corresponding ones of the configuration registers 180 of the I/O bus interface circuit 134 associated with each I/O bus are loaded via the CAT bus with the specific address ranges for the corresponding I/O bus. In this way, available memory and I/O space is partitioned among the multiple I/O buses. Specific address registers provided within the configuration registers 180 of the illustrated embodiment include: a Top/Bottom of I/O bus Memory register, TOM/BOM, to specify the range of memory addresses allocated to a particular I/O bus; a Top/Bottom of I/O addresses register, TIO/BIO, to specify the range of I/O addresses allocated to a particular I/O bus; a ROM expansion register to specify which of the 8K wide expansion ROM slices in the 768K to 896K range are allocated to a particular I/O bus; and, an 8M–16M local bits register to specify which of the 1M slices in the 8M–16M range are allocated to a particular I/O bus to support 24-bit address bus agents.

There are certain fixed addresses associated with available I/O bus hardware. In the IBM Micro Channel hardware all of these fixed addresses reside in the lowest 512 byte block of I/O space. For example, I/O ports 0100h–0107h are reserved for configuring agents. When an agent is put into setup mode, it responds to this range of I/O address space and this range only for configuration purposes. Since all agents use the same range of I/O address space, a system bus address decoder 182 is provided to distinguish agents on different I/O buses, yet at the same time ensure all agents on all I/O buses still see the same range of I/O address space. A programmable address translation arrangement is provided in the I/O bus interface circuit 134 by means of a dedicated translation register within the configuration registers 180. At the time of system configuration, the dedicated translation register in each I/O bus interface circuit 134 is loaded via the CAT bus with a base value used to decode or translate accesses to these fixed addresses.

For example, assume the I/O interface circuits 134, 136, which are respectively connected to I/O buses 114, 116, as shown in FIGS. 1A and 1B, have translation base values of 0000h and 0400h for their system bus address decoders. The system bus address decoder 182 of the I/O bus 114, as shown in FIG. 7, with a translation base value 0000h responds to the 512 byte block starting at 0000h. When a processor configures agents on this I/O bus, it does so through ports 0100h–0107h per I/O bus definition. To configure agents on the second I/O bus 116, it does so through ports 0500–0507h, i.e. same offset into the 512 byte block, but now relative to 0400h instead of 0000h. However, the system bus address decoder of the I/O bus interface circuit 136 of the second I/O bus 116 (this decoder is not shown, but it is substantially the same as system bus decoder 182 in FIG. 7) strips out the offset before propagating the cycle onto the second I/O bus 116 so that agents on the second I/O bus 116 still see configuration cycles at 0100h–0107h.

Having thus described the invention of the present application in detail and by reference to preferred embodiments thereof, it will be apparent that modifications and variations are possible without departing from the scope of the invention defined in the appended claims.

What is claimed is:

1. A computer system, comprising:
    a system bus;
    a processor connected to said system bus;
    a first I/O interface circuit connected to said system bus;
    a second I/O interface circuit connected to said system bus;
    a first I/O bus connected to said first I/O interface circuit, wherein the first I/O bus has a first set of fixed addresses associated with said first I/O bus; and
    a second I/O bus connected to said second I/O interface circuit, wherein the second I/O bus has a second set of fixed addresses associated with said second I/O bus, and further wherein the first set of fixed addresses are the same as the second set of fixed addresses,
    wherein said first I/O interface circuit includes (1) means for identifying memory addresses and I/O addresses assigned to said first I/O bus by the computer system, and (2) means for translating addresses during accesses to the first set of fixed addresses associated with said first I/O bus from memory addresses and I/O addresses assigned to said first I/O bus by the computer system into addresses of the first set of fixed addresses associated with said first I/O bus, and
    wherein said second I/O interface circuit includes (1) means for identifying memory addresses and I/O addresses assigned to said second I/O bus by the computer system, and (2) means for translating addresses during accesses to the second set of fixed addresses associated with said second I/O bus from memory addresses and I/O addresses assigned to said second I/O bus by the computer system into addresses of the second set of fixed addresses associated with said second I/O bus.

2. The computer system of claim 1, wherein (a), (b), (c) and (d) below are each programmable by said processor at the time during which the computer system is configured:
    (a) said means for identifying memory addresses and I/O addresses assigned to said first I/O bus by the computer system,
    (b) said means for translating addresses during accesses to the first set of fixed addresses associated with said first I/O bus from memory addresses and I/O addresses assigned to said first I/O bus by the computer system into addresses of the first set of fixed addresses associated with said first I/O bus,
    (c) said means for identifying memory addresses and I/O addresses assigned to said second I/O bus by the computer system, and
    (d) said means for translating addresses during accesses to the second set of fixed addresses associated with said second I/O bus from memory addresses and I/O addresses assigned to said second I/O bus by the computer system into addresses of the second set of fixed addresses associated with said second I/O bus.

3. The computer system of claim 1, wherein:
    said means for identifying memory addresses and I/O addresses assigned to said second I/O bus by the computer system includes a first register set for receiving data from said processor identifying ranges of memory addresses and ranges of I/O addresses allocated to said first I/O bus, and
    said means for identifying memory addresses and I/O addresses assigned to said second I/O bus by the computer system includes a second register set for receiving data from said processor identifying ranges of memory addresses and ranges of I/O addresses allocated to said second I/O bus.

4. The computer system of claim 3, wherein:
    the first register set includes (1) a first memory register for receiving data identifying the range of memory addresses for said first I/O bus, and (2) a first I/O register for receiving data identifying the range of I/O addresses for the first I/O bus, and
    the second register set includes (1) a second memory register for receiving data identifying the range of memory addresses for said second I/O bus, and (2) a second I/O register for receiving data identifying the range of I/O addresses for the second I/O bus.

5. The computer system of claim 4, wherein:
    the first register set further includes (1) a first ROM expansion register for receiving data identifying expansion ROM slices for the first I/O bus, and
    the second register set further includes (1) a second ROM expansion register for receiving data identifying expansion ROM slices for the second I/O bus.

6. The computer system of claim 5, wherein:

the first register set further includes (1) a first 8M (Megabyte)-16M local bits register for receiving data identifying which 1M slice in the 8M–16M range is allocated to the first I/O bus, and the second register set further includes (1) a second 8M–16M local bits register for receiving data identifying which 1M slice in the 8M–16M range is allocated to the second I/O bus.

7. The computer system of claim 6, wherein:

said means for translating addresses during accesses to the first set of fixed addresses associated with said first I/O bus from memory addresses and I/O addresses assigned to said first I/O bus by the computer system into addresses of the first set of fixed addresses associated with said first I/O bus includes a first translation register for receiving data from said processor to identify a first base offset value used to translate addresses used to access addresses of the first set of fixed addresses associated with said first I/O bus, and said means for translating addresses during accesses to the second set of fixed addresses associated with said second I/O bus from memory addresses and I/O addresses assigned to said second I/O bus by the computer system into addresses of the second set of fixed addresses associated with said second I/O bus includes a second translation register for receiving data from said processor to identify a second base offset value used to translate addresses used to access addresses of the second set of fixed addresses associated with said second I/O bus.

8. The computer system of claim 1 wherein said first I/O bus and said second I/O bus are Micro Channel I/O buses.

9. A method for interfacing a plurality of I/O buses to a system bus in a computer system, with the system bus having a processor coupled thereto, comprising the steps of:

providing a first I/O bus having a first set of fixed addresses associated therewith;

providing a second I/O bus having a second set of fixed addresses associated therewith, wherein the first set of fixed addresses are the same as the second set of fixed addresses;

assigning memory addresses and I/O addresses to the first I/O bus and the second I/O bus by the computer system, and translating addresses during accesses to the first set of fixed addresses associated with the first I/O bus or the second set of fixed addresses associated with the second I/O bus from memory addresses and I/O addresses assigned to the first I/O bus or the second I/O bus by the computer system into addresses of the first set of fixed addresses associated with the first I/O bus or the second set of fixed addresses associated with the second I/O bus.

10. The method of claim 9, wherein the assigning step includes the steps of:

providing a first register and a second register;

transferring a first quantity of data from the processor to the first register, wherein the first quantity of data identifies ranges of memory addresses and ranges of I/O addresses allocated to the first I/O bus; and transferring a second quantity of data from the processor to the second register, wherein the second quantity of data identifies ranges of memory addresses and ranges of I/O addresses allocated to the second I/O bus.

11. The method of claim 10, wherein:

the first quantity of data is transferred to the first register during configuration of the computer system, and the second quantity of data is transferred to the second register during configuration of the computer system.

12. The method of claim 9, wherein the translating step includes the steps of:

providing a first translation register and a second translation register;

transferring a first quantity of data from the processor to the first translation register, wherein the first quantity of data identifies a first base offset value used to translate addresses used to access addresses of the first set of fixed addresses associated with said first I/O bus; and transferring a second quantity of data from the processor to the second translation register, wherein the second quantity of data identifies a second base offset value used to translate addresses used to access addresses of the second set of fixed addresses associated with said second I/O bus.

13. The method of claim 12, wherein:

the first quantity of data is transferred to the first translation register during configuration of the computer system, and the second quantity of data is transferred to the second translation register during configuration of the computer system.

14. The method of claim 9, wherein the first I/O bus and the second I/O bus are each a Micro Channel I/O bus.

15. A method for interfacing a plurality of I/O buses to a system bus in a computer system, comprising the steps of:

providing a first I/O bus having a first set of fixed addresses associated therewith;

providing a second I/O bus having a second set of fixed addresses associated therewith, wherein the first set of fixed addresses are the same as the second set of fixed addresses;

assigning memory addresses and I/O addresses to the first I/O bus and the second I/O bus by the computer system, translating addresses during accesses to the first set of fixed addresses associated with the first I/O bus from memory addresses and I/O addresses assigned to the first I/O bus by the computer system into addresses of the first set of fixed addresses associated with the first I/O bus; and translating addresses during accesses to the second set of fixed addresses associated with the second I/O bus from memory addresses and I/O addresses assigned to the second I/O bus by the computer system into addresses of the second set of fixed addresses associated with the second I/O bus.

* * * * *